(12) United States Patent
Isenman

(10) Patent No.: US 6,275,219 B1
(45) Date of Patent: Aug. 14, 2001

(54) DIGITIZING PROJECTION DISPLAY

(75) Inventor: Colin C. Isenman, Miamisburg, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/110,269

(22) Filed: Aug. 23, 1993

(51) Int. Cl.[7] .................................................. G09G 5/00
(52) U.S. Cl. .............................................................. 345/173
(58) Field of Search .......................... 345/173; 362/294; 353/34; 346/160

(56) References Cited

U.S. PATENT DOCUMENTS

| | | | |
|---|---|---|---|
| 3,699,439 | 10/1972 | Turner ................................. | 324/71.1 |
| 4,055,726 | 10/1977 | Turner et al. ........................ | 178/18 |
| 4,456,787 | 6/1984 | Schlosser et al. ................... | 178/19 |
| 4,523,654 | 6/1985 | Quayle et al. ....................... | 178/19 |
| 4,600,807 | 7/1986 | Kable ................................... | 178/19 |
| 4,649,232 | 3/1987 | Nakamura et al. .................. | 178/18 |
| 4,650,926 | 3/1987 | Nakamura et al. .................. | 178/18 |
| 4,665,283 | 5/1987 | Kable et al. ......................... | 178/19 |
| 4,678,869 | 7/1987 | Kable ................................... | 178/19 |
| 4,695,680 | 9/1987 | Kable ................................... | 178/19 |
| 4,699,498 * | 10/1987 | Naemura ............................. | 346/160 |
| 4,707,572 | 11/1987 | Kable et al. ......................... | 178/18 |
| 4,853,493 | 8/1989 | Schlosser et al. ................... | 178/18 |
| 4,873,398 | 10/1989 | Hubby, Jr. ........................... | 178/18 |
| 4,938,570 | 7/1990 | Majima et al. ...................... | 359/45 |
| 4,945,348 | 7/1990 | Ibamoto et al. ..................... | 345/104 |
| 4,969,731 * | 11/1990 | Ogino .................................. | 353/34 |
| 5,282,121 * | 1/1994 | Bornhorst ............................ | 362/294 |

OTHER PUBLICATIONS

"Everex Shows New Display Technology", *The Seybold Report on Publishing Systems*; vol. 21, No. 20; p. 47.

* cited by examiner

Primary Examiner—Minsun Oh Harvey
(74) Attorney, Agent, or Firm—Gregory A. Welte

(57) ABSTRACT

The invention relates to a visual display in which a liquid-crystal matrix generates an image on a screen. (The liquid-crystal matrix acts somewhat like a 35 mm slide.) The screen contains a digitizer which detects the position of a hand-held pointer. The detected position can be reported to a computer, which is involved in generating the image. The screen can be small, as in a notebook computer, or the screen can be as large as a drafting table or chalkboard.

9 Claims, 21 Drawing Sheets

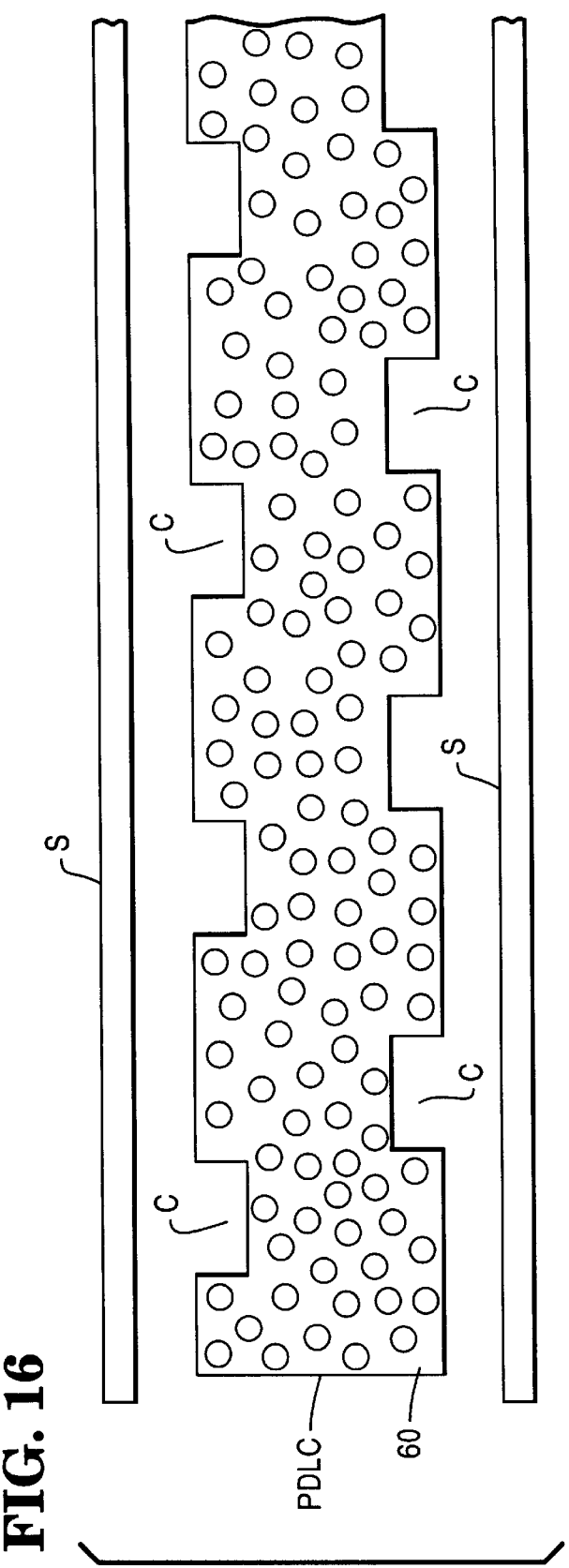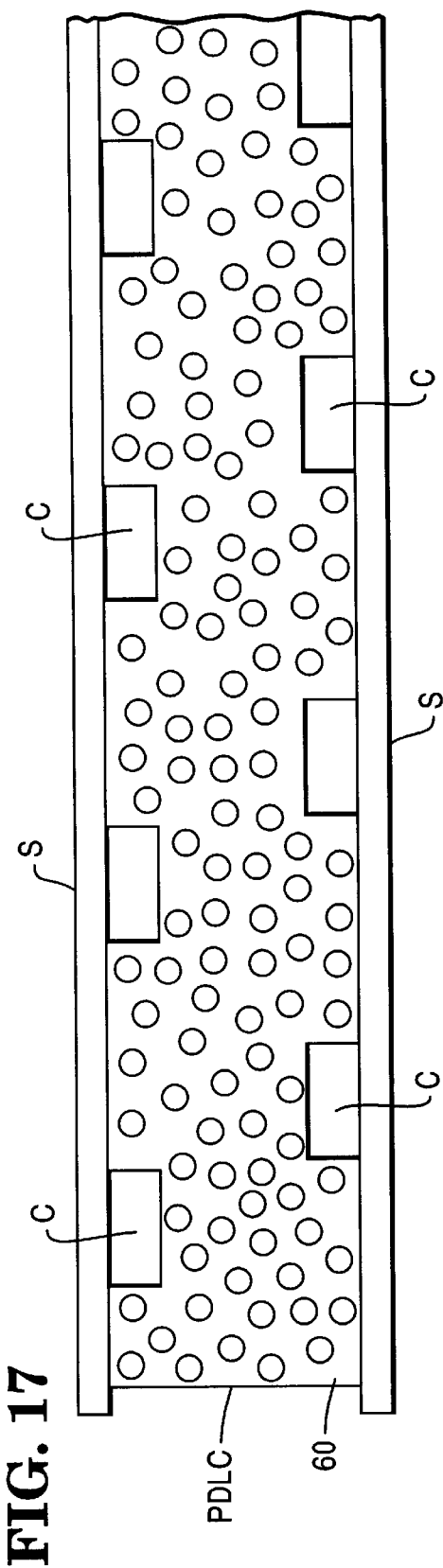

FIG. 24
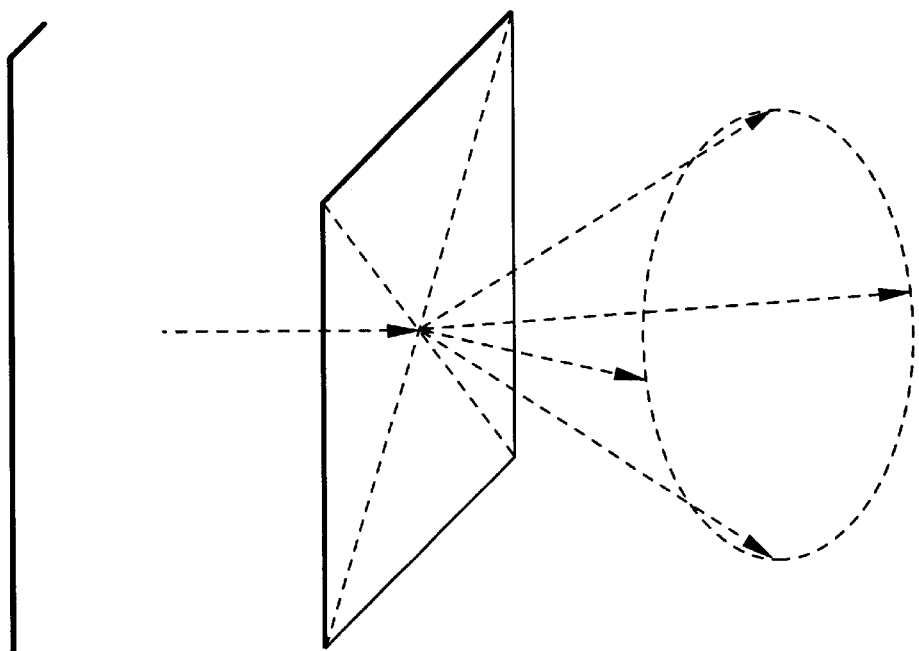
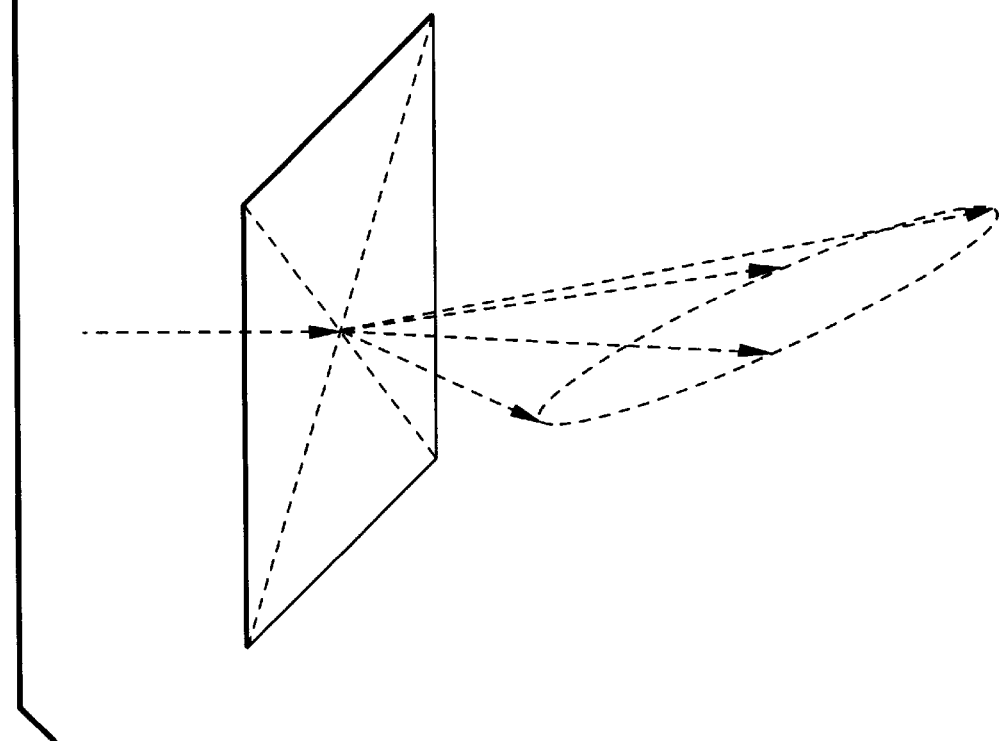

DIGITIZING PROJECTION DISPLAY

The invention concerns optical projection displays, and, specifically, such displays having an associated digitizer which detects the position of a hand-held pointer contacting the display.

BACKGROUND OF THE INVENTION

FIG. 1 is a schematic of a large-screen video display. Three cathode-ray tubes, CRT, generate identical images. One image is typically red, one is green, and one is blue. Each CRT has an associated lens system and collimator, LC, which captures the CRT's image and projects it to a dichroic mirror, DCM. The DCM combines the three images, and a fourth lens system L projects the combined image to a display screen D, via a mirror M.

The large number of components in such a projection system imposes high cost. Further, the optical elements require precise mechanical alignment, which is expensive to both achieve and maintain. Also, all of the optical elements must be protected from ambient dust, which requires either periodic cleaning or enclosure in a dust-free container. The container imposes added cost, together with the problem (perhaps minor) of dissipating the heat generated by now-enclosed CRTs.

An alternate projection system is shown in FIG. 2. A light source 3 produces light 6 which is collimated by a lens system 9. The collimated light is projected through a liquid crystal display 12, which acts as a shutter. The liquid crystal display can be of the monochrome- or color type. A heat shield 11 protects the LCD from the heat of the light source 3.

FIG. 3 shows the shuttering operation. Some pixels 16 are dark, and eclipse the collimated light 6. Other pixels 18 are bright, and transmit the collimated light 6. In the example of FIG. 3, the letter "d" is generated on the display screen D. The collimated light is modulated pixel-by-pixel.

The alternate projection system contains fewer parts, compared with that of FIG. 1. The present invention is yet a further improvement of this alternate system.

OBJECTS OF THE INVENTION

It is an object of the invention to provide an improved large-screen display.

It is a further object of the invention to provide a projection-type display which can detect the location of a pointer which contacts the display.

SUMMARY OF THE INVENTION

In one form of the invention, a large-screen video display includes a transmissive liquid crystal shutter, which modulates light received from a light source, and projects the modulated light to a screen. The screen contains a digitizer which ascertains the x- and y-coordinates of a pointer located near the screen.

BRIEF DESCRIPTION OF THE DRAWINGS

FIGS. 16 and 17 illustrate cooling channels within the PDLC of FIG. 15.

FIG. 24 illustrates how a holographic diffuser can adjust aspect ratio of the output lobes.

DETAILED DESCRIPTION OF THE INVENTION

Figure 4:
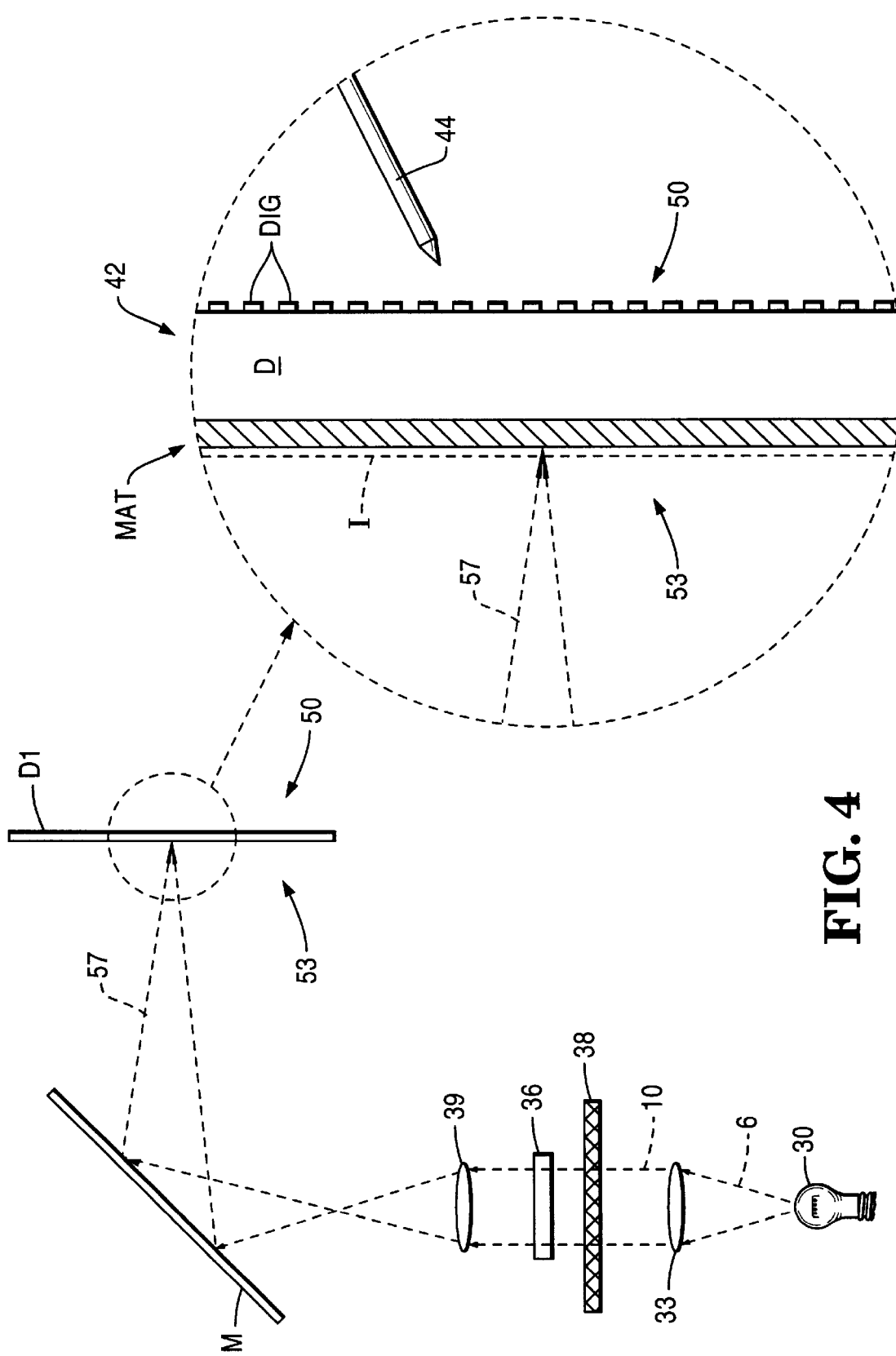
FIG. 4 illustrates one form of the invention.

In FIG. 4 a light source 30 projects light to a collimating lens 33, which projects a collimated beam 10 to a Liquid Crystal (LC) shutter 36. A heat shield 38 protects the LC shutter 36 from heat of the light source 30. A projection lens 39 focuses the image generated by the LC shutter onto a display D1.

The display D1 contains a transparent substrate 42, such as glass, or a plastic such as polycarbonate, or acrylic, which carries a matte surface MAT and a grid of digitizing elements D1G. The matte surface acts as a diffusive medium for displaying the image.

The digitizing grid detects the x- and y-coordinates of a hand-held stylus or pointer 44. Digitizing grids and other digitizing systems are known in the art. Several types of digitizer patents are incorporated by reference at the end of this Specification.

The display D has two sides: (1) a user side (or observation side) 50, from which an observer (not shown) both views the image I and applies the pointer 44, and (2) a projection side 53, onto which the light rays 57 enter which generate the image.

In FIG. 4, the digitizing grid D1G is located on the user side 50, while the matte surface MAT is located on the projection side 53. Other arrangements are possible.

Figure 5:
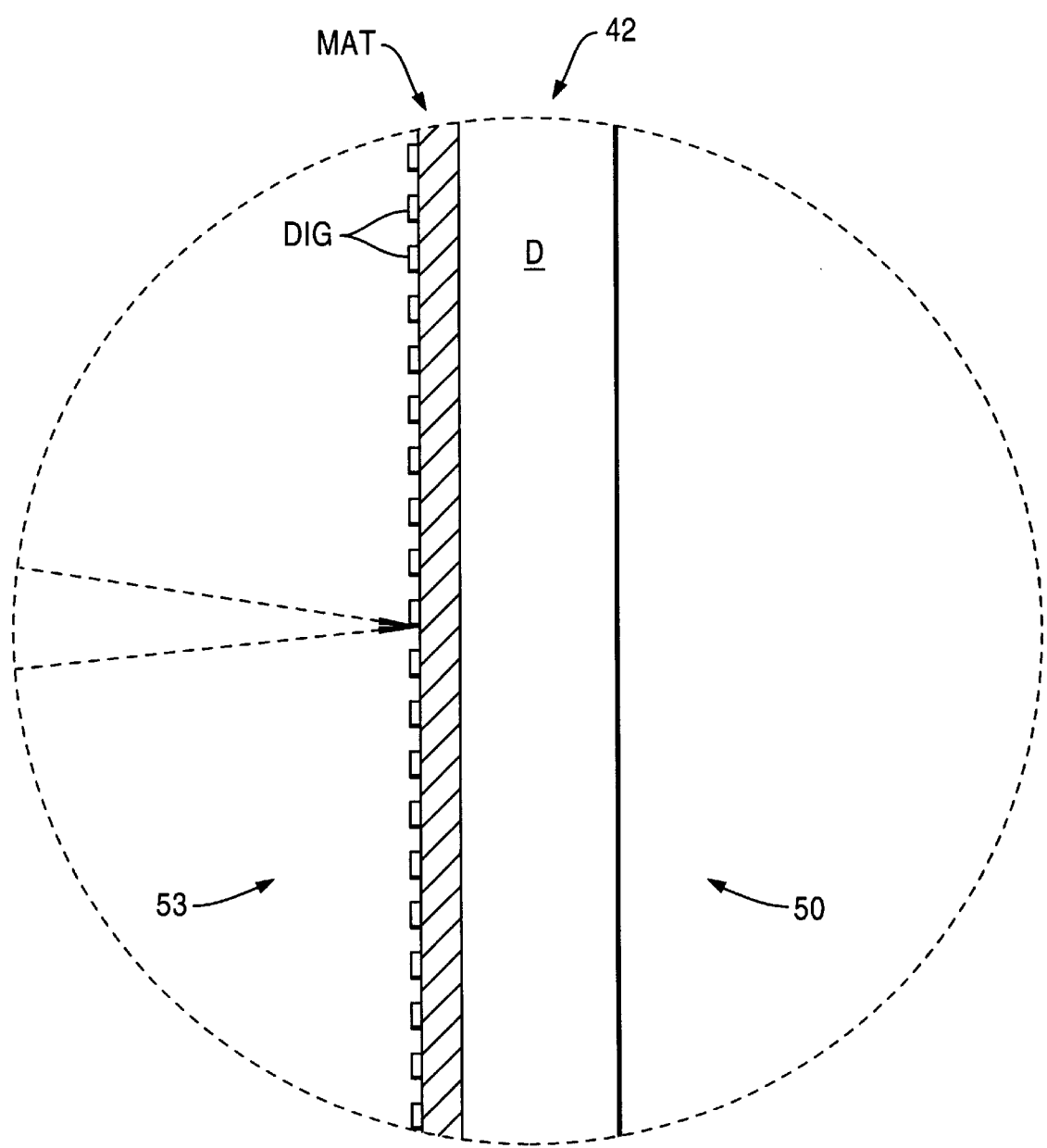
FIGS. 5–7 illustrate alternate configurations for the display D1 of FIG. 4.
Figure 6:
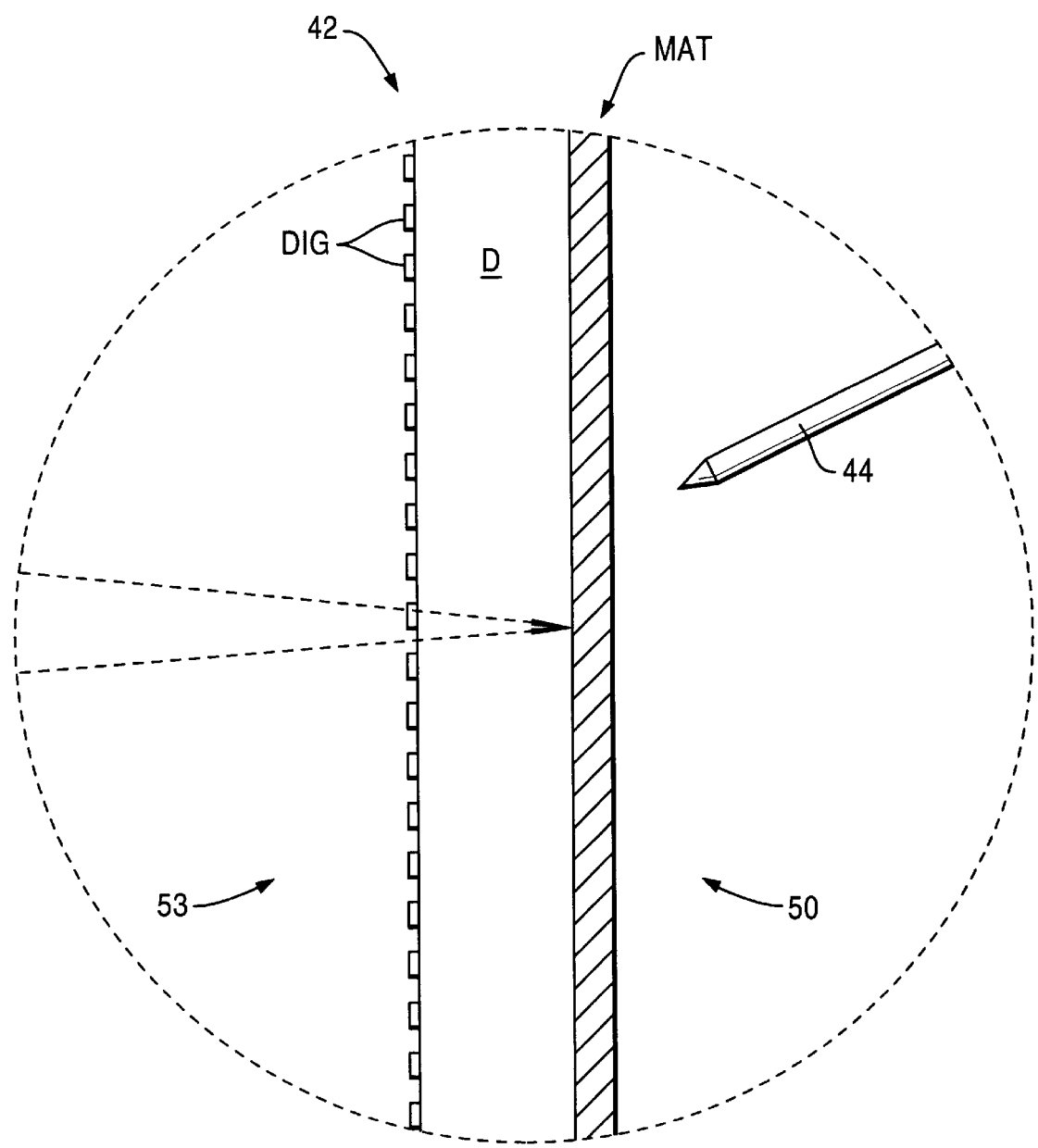

For example, FIG. 5 shows both the digitizing grid and the matte surface located on the projection side 53. FIG. 6 shows the digitizing grid on the projection side 53 and the matte surface on the user side 50. This latter configuration can be desirable when a proper tactile feel is desired for the user, as when the pointer 44 takes the form of a pen which physically contacts the display D, as in pen-based computer displays.

An analogy can explain the tactile feel. Certain transparent adhesive tapes have a smooth, glossy surface. It is difficult to write on such tapes, using a graphite pencil. Other such tapes have a frosted, or matte surface, which is not smooth and glossy. It is easier to write on such tapes using a graphite pencil.

In contrast with the adhesive tape, a user will not actually write upon a computer display using a graphite pencil. Instead, the user will place a hand-held stylus 44 into contact with the display D in FIG. 6, and manipulate the stylus 44 as though the stylus were, in fact, a pencil. The contact between the stylus and the matte surface provides friction, and gives a tactile feel to the user which resembles that of a graphite pencil.

Figure 7:
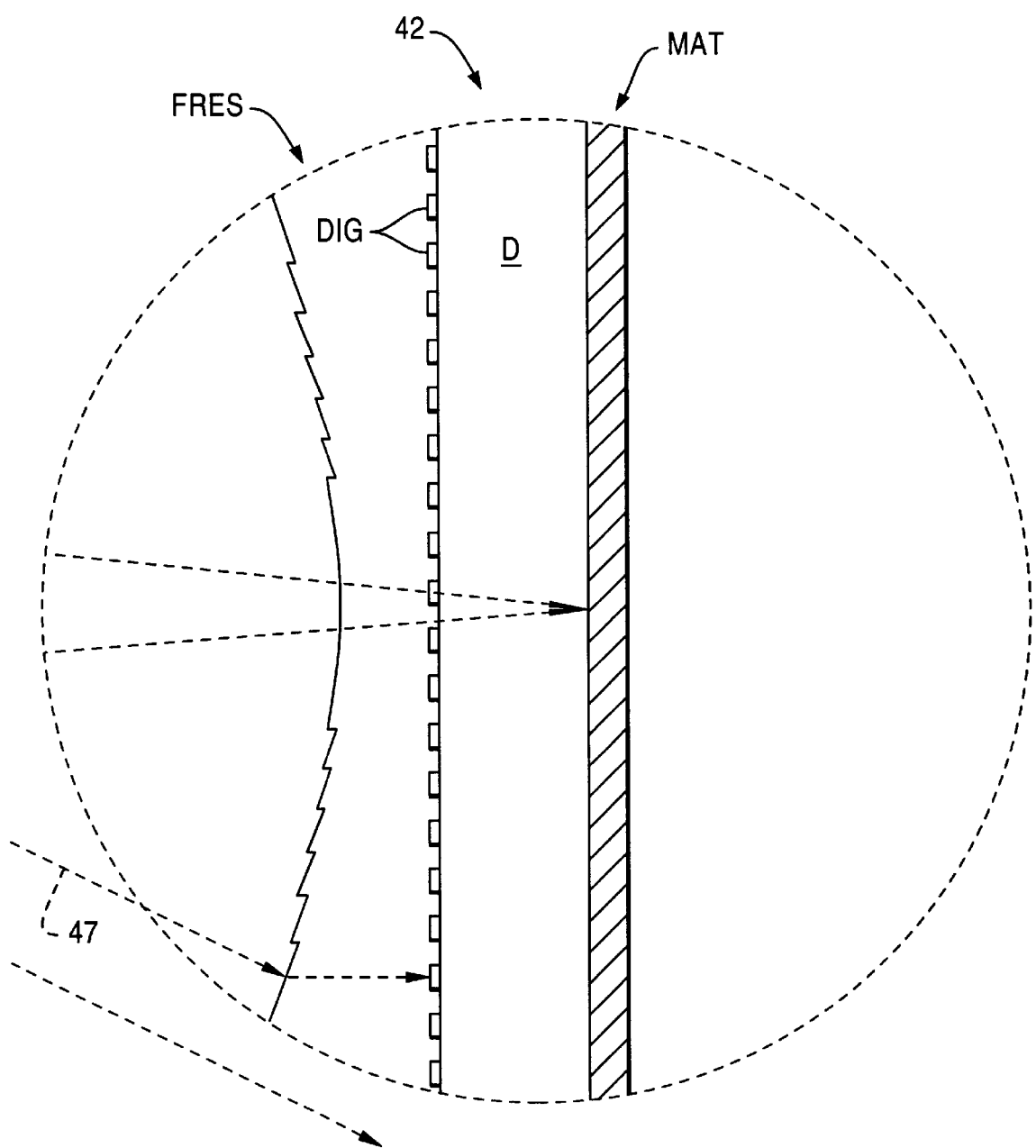

FIG. 7 shows a fresnel lens FRES in contact with the display D. The fresnel lens has two primary functions. One, it reduces divergence of rays at the periphery of the image, as indicated by the bending of ray 47. Two, it cooperates with the projection lens 39 in FIG. 4 to form the image on the display D.

In some designs, it may be preferable to eliminate the projection lens 39, and rely exclusively on the fresnel lens FRES for image generation. Alternately, the projection lens 39 can be used exclusively.

Additional Considerations

1. Prior-art liquid-crystal shutters and liquid-crystal displays generally employ a pair of polarizing filters. One form of the invention eliminates these filters, together with their attendant light attenuation. Before explaining this elimination, this discussion will first give a brief explanation of the operation of liquid crystal displays.

Figure 8:
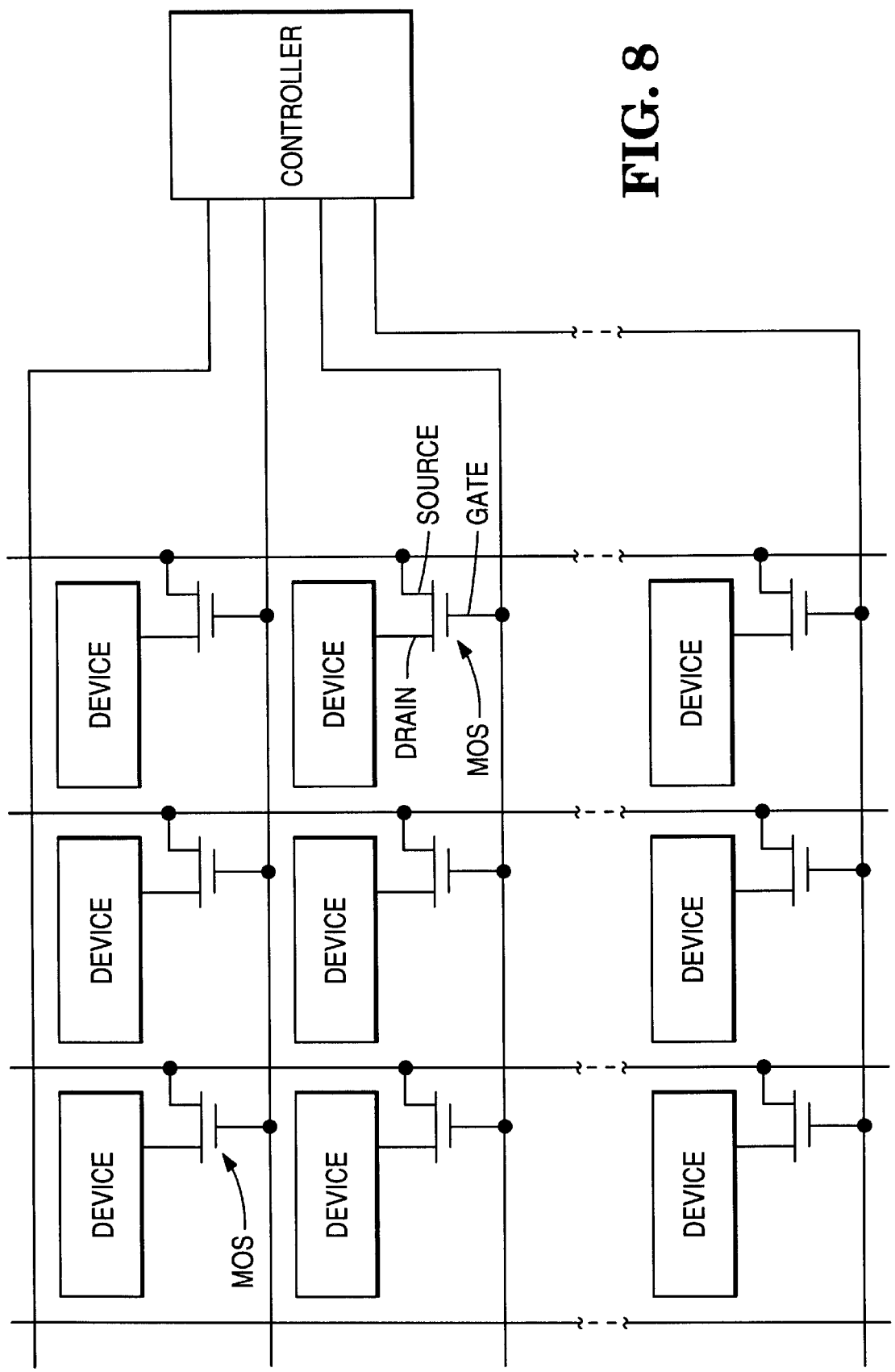
FIG. 8 illustrates 9 pixels in a liquid crystal display.

FIG. 8 illustrates nine pixels of a Liquid-Crystal Display (LCD). Each pixel is represented by a box labeled DEVICE. Each pixel has a transistor, labeled MOS, which turns the pixel on and off.

Figure 1:
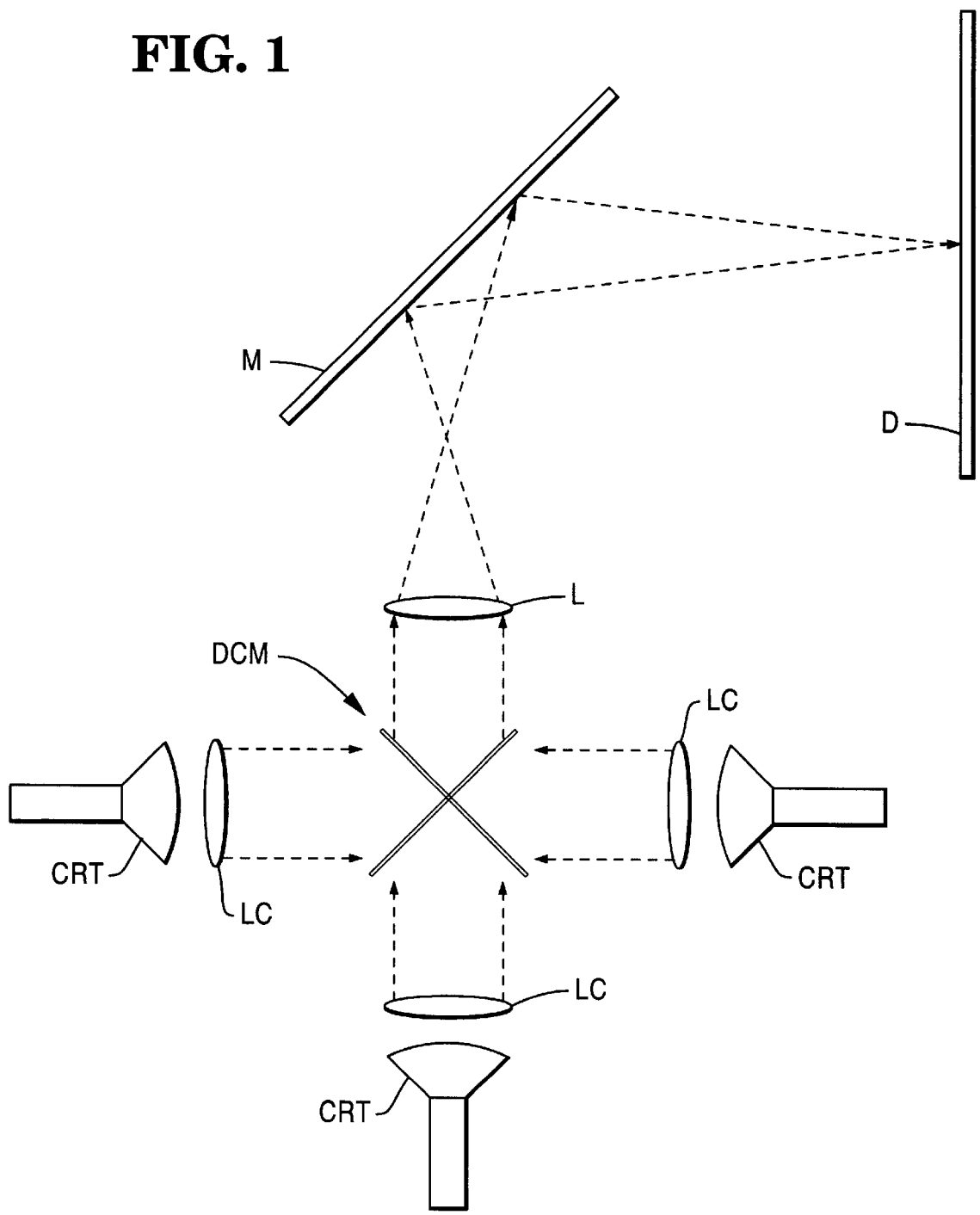
FIGS. 1 and 2 illustrate video projection systems.
Figure 2:
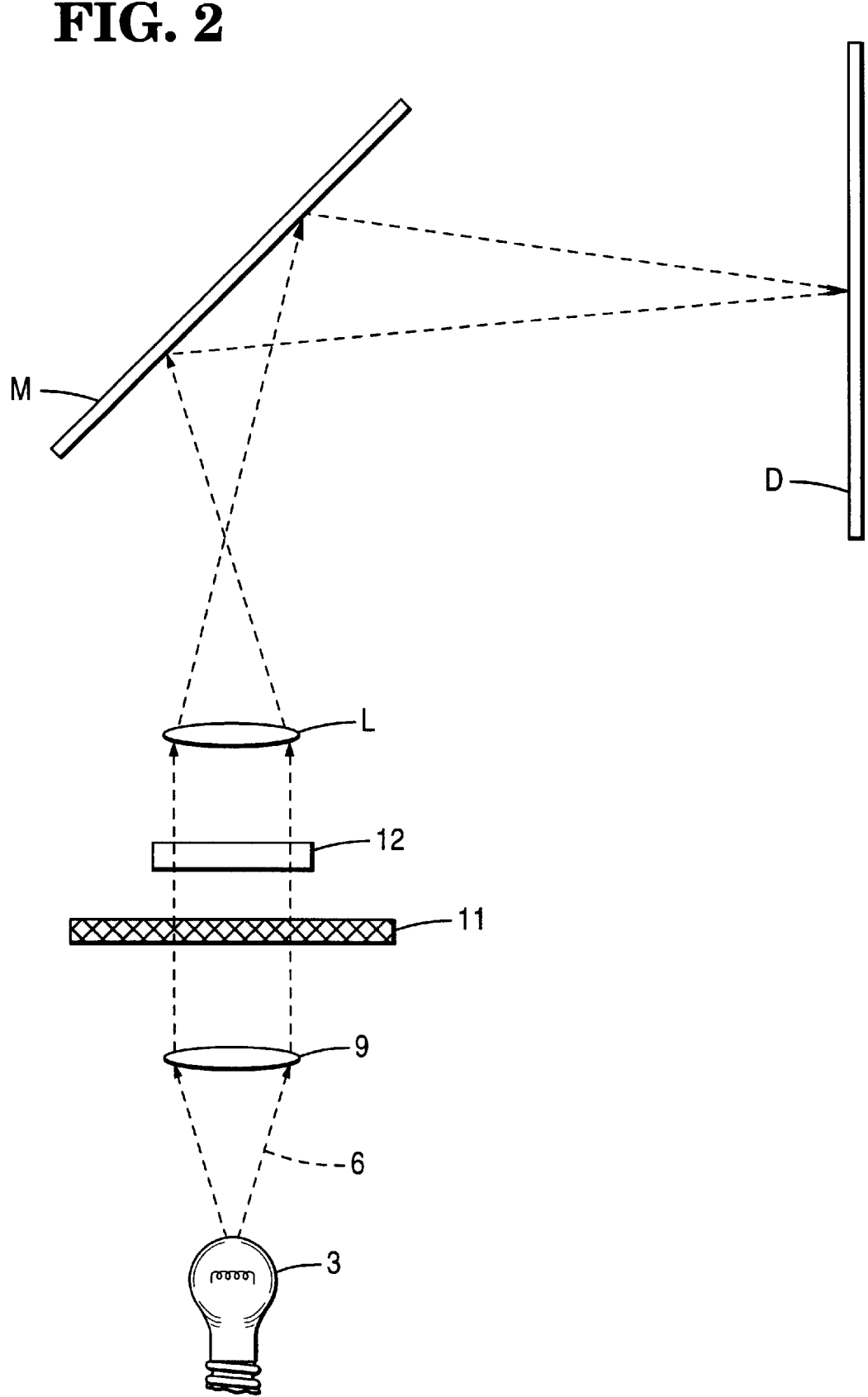
Figure 3:
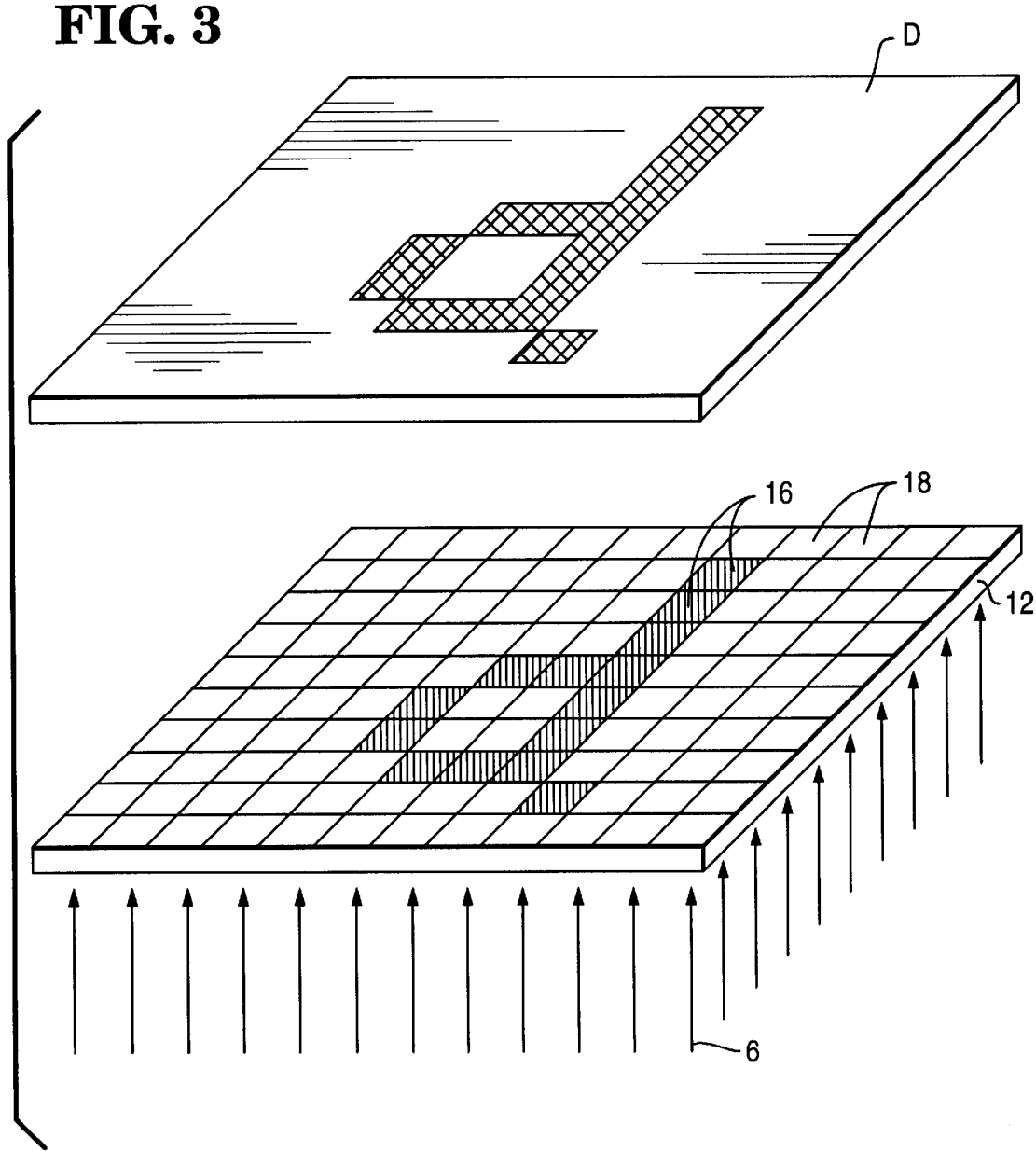
FIG. 3 illustrates how the liquid crystal shutter 12 of FIG. 2 modulates incoming light 6 on a pixel-by-pixel basis.
Figure 9:
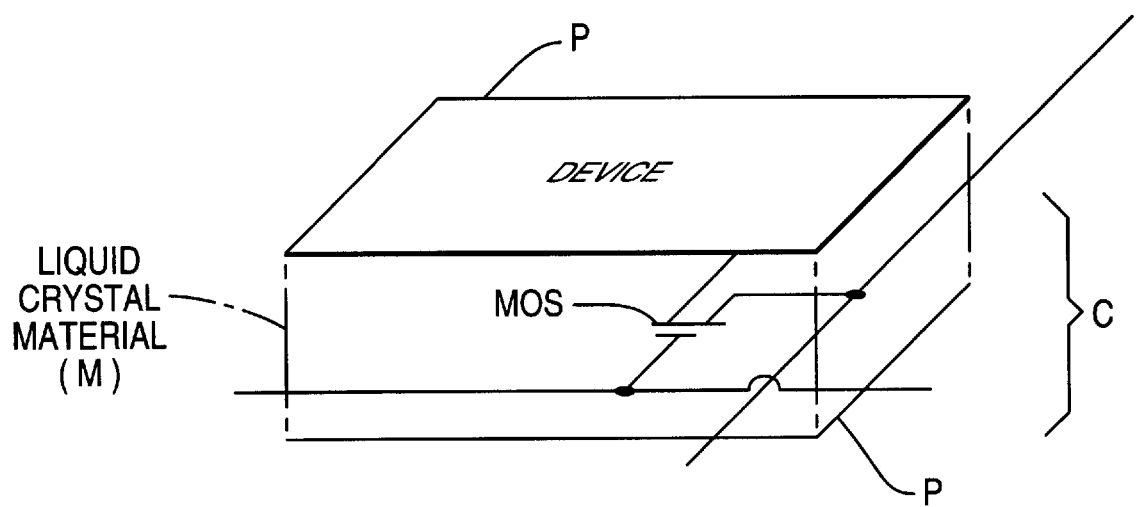
FIG. 9 illustrates one of the pixels of FIG. 8.

The operation of the pixels can be explained, in a very simplified manner, as follows. In FIG. 9, liquid crystal material M is contained between the plates P of a capacitor C. (Each box labeled "DEVICE" in FIG. 1 contains one of the capacitors C of FIG. 9.)

Figure 10:
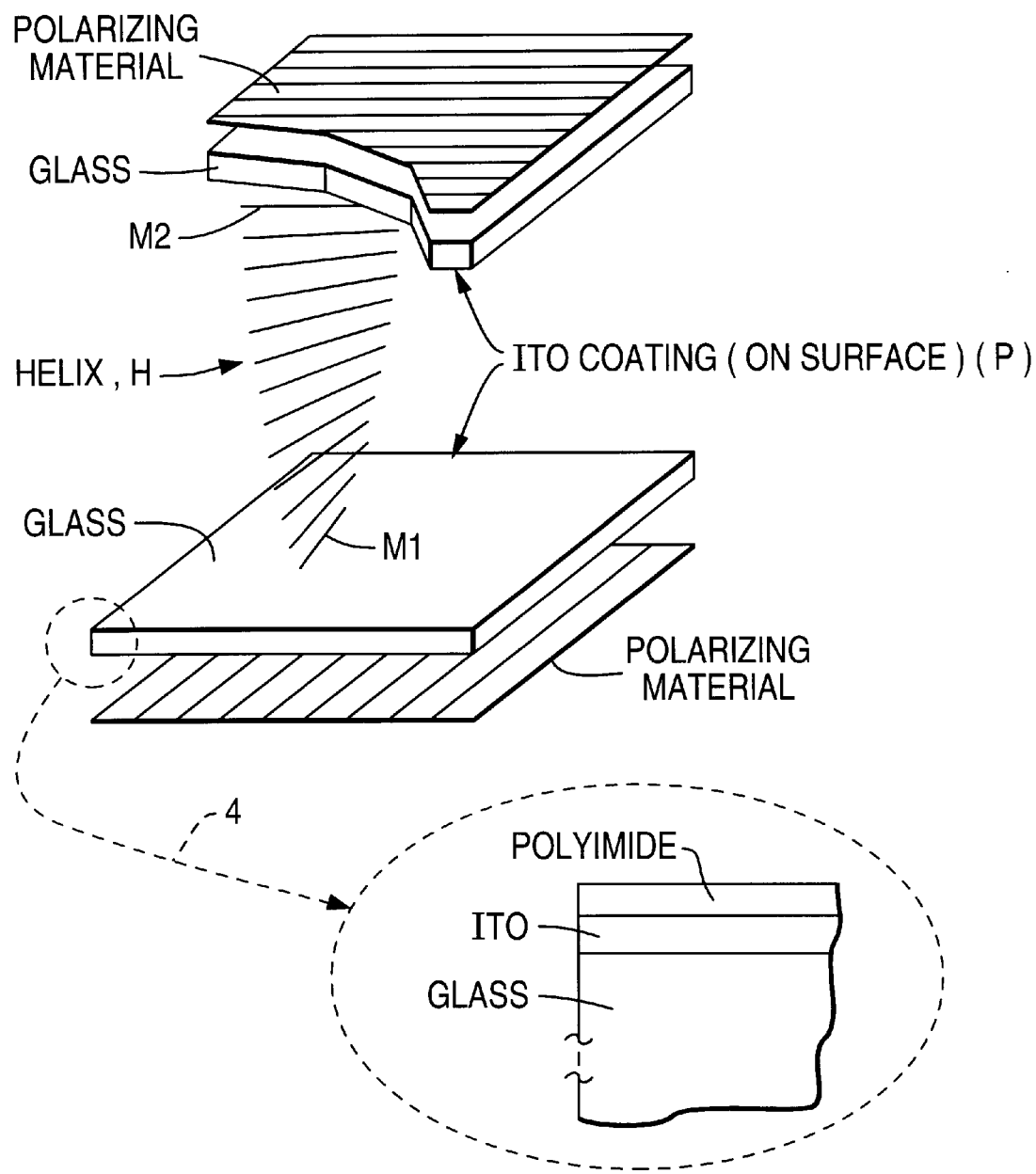
FIG. 10 illustrates a helix of molecules contained within the pixel of FIG. 9.

Each plate P in FIG. 9 actually takes the form of a thin coating of Indium Tin Oxide, ITO, on GLASS, as indicated in FIG. 10. Each coating of ITO, in turn, bears a coating of polyimide, as indicated in the insert 4. Previously, the polyimide has been buffed during manufacture, in a single direction. The buffing placed parallel "scratches" on the polyimide.

When a liquid crystal is placed between the GLASS sheets, the scratches induce adjacent molecules of the liquid crystal to align with the scratches. For example, molecules M1 and M2 align as shown.

The GLASS sheets are aligned such that molecules M1 and M2 are perpendicular to each other, as shown. The molecules located in the bulk of the liquid crystal try to align themselves with M1 and M2, but, because M1 and M2 are perpendicular, the bulk molecules are forced to align into a helix H which bridges M1 and M2.

Figure 11:
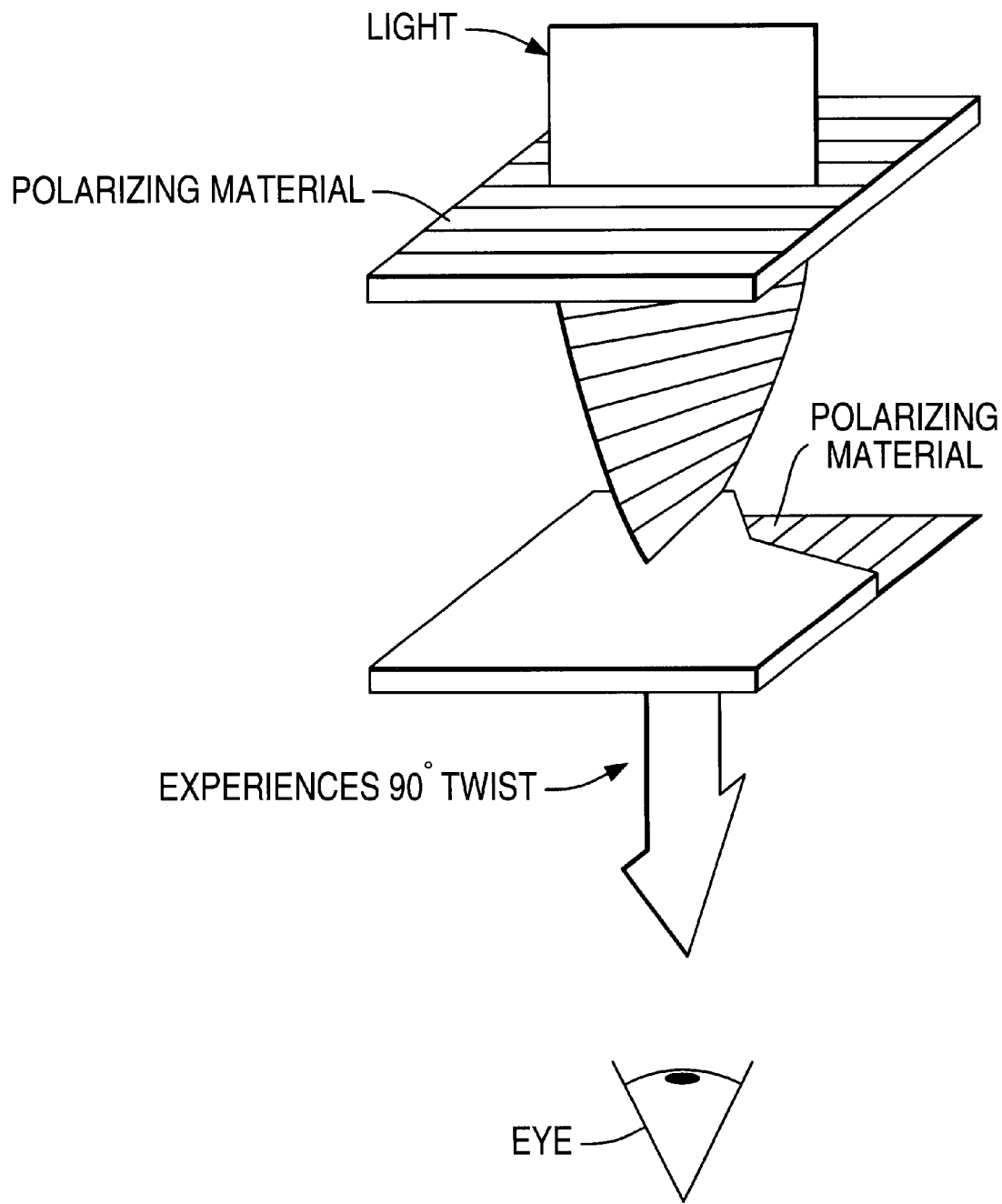
FIG. 11 illustrates how the helix of FIG. 10 twists incoming light and transmits it.

Polarizing filters are affixed to each sheet of GLASS, as indicated. When incoming LIGHT enters, as shown in FIG. 11, the polarization of the LIGHT follows the helix H, and the LIGHT undergoes a continuous 90-degree twist, as shown, and exits through the bottom polarizing filter. The human EYE, perceives the pixel as bright, because of the exiting LIGHT.

Figure 12:
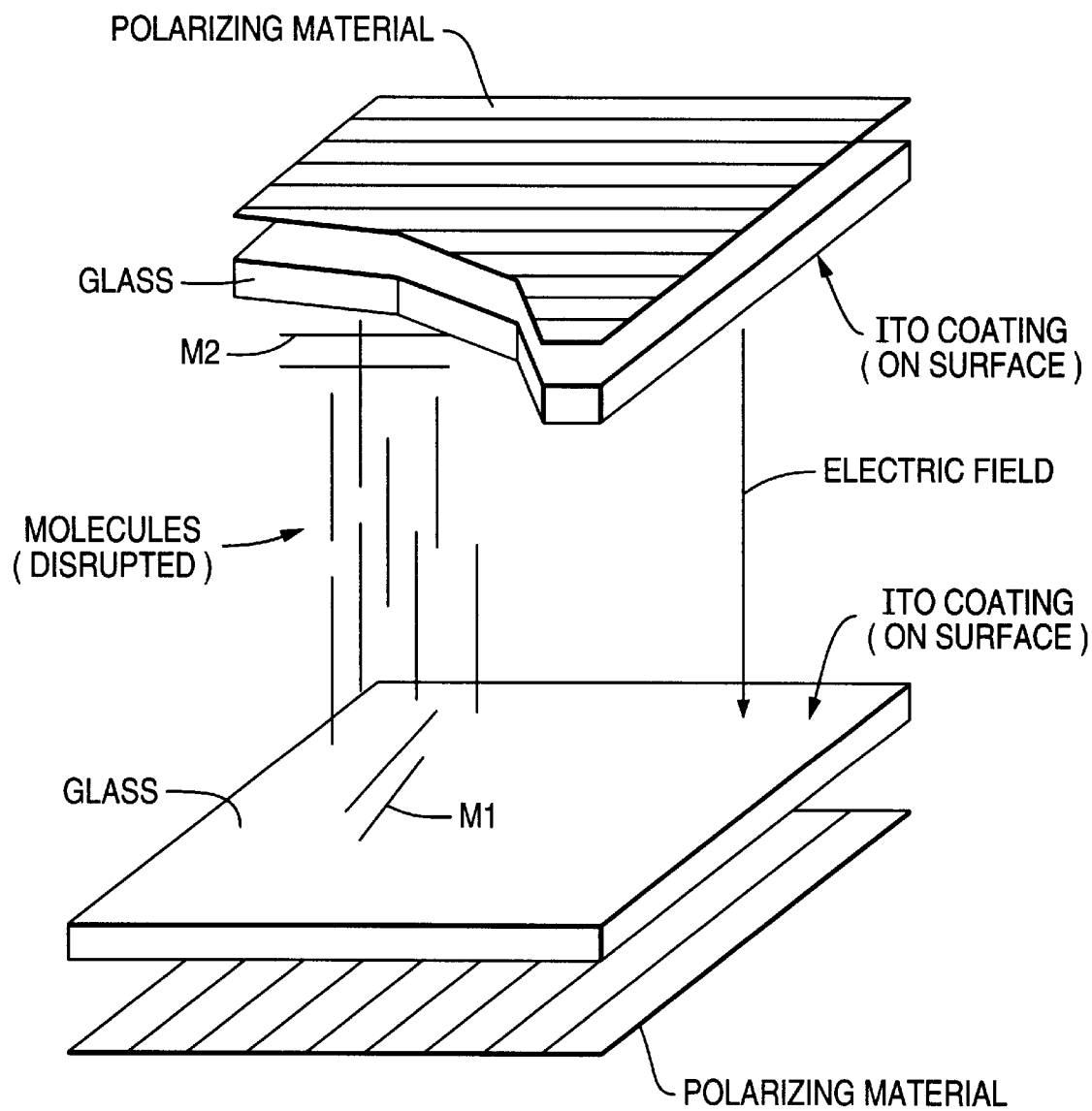
FIG. 12 illustrates how an electric field disrupts the helix of FIG. 10.
Figure 13:
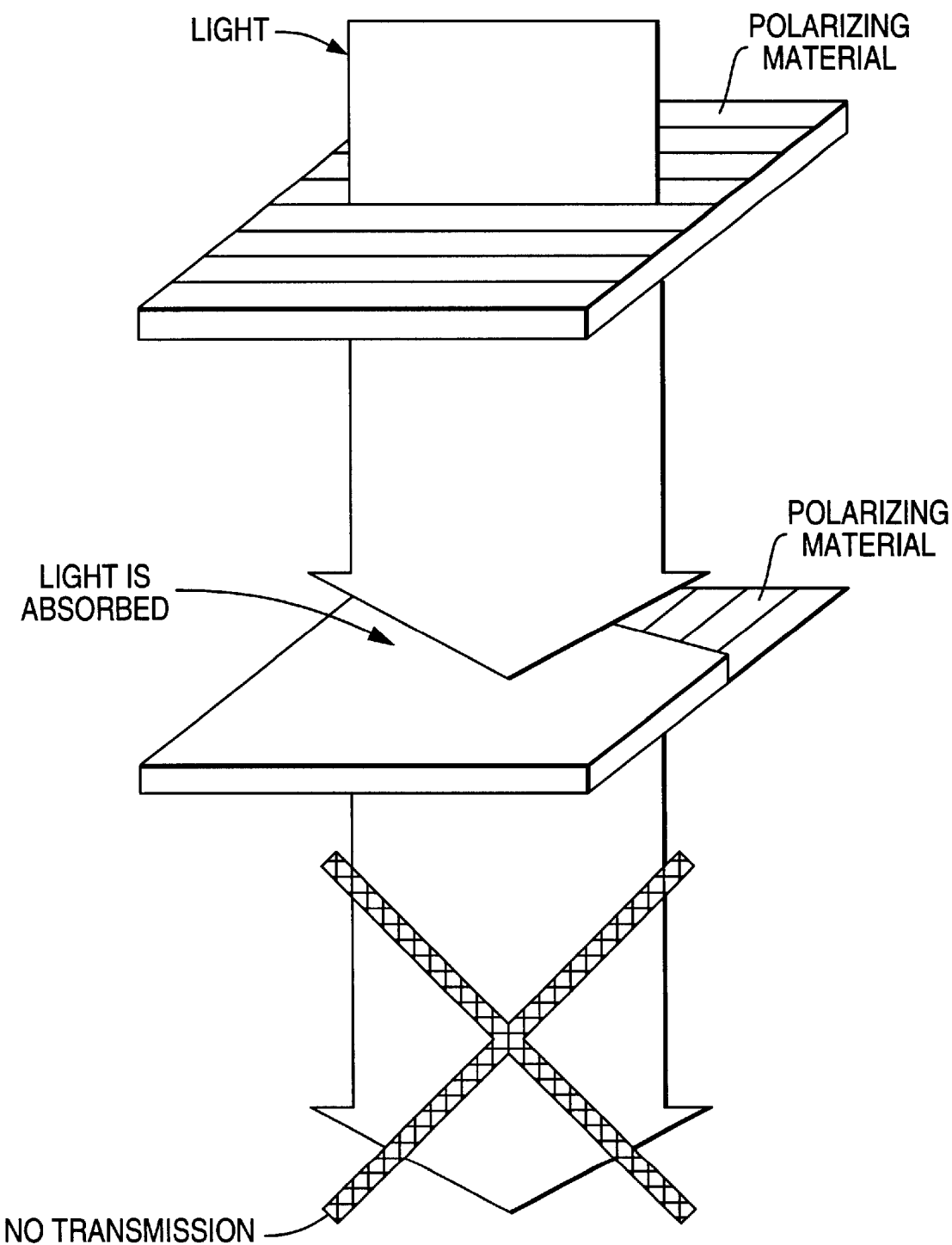
FIG. 13 illustrates how the disrupted molecules of FIG. 12 fail to transmit light.

However, when a small voltage (such as 3–5 volts) is applied between the ITO plates, the voltage creates an ELECTRIC FIELD in FIG. 12, which disturbs the gradual twist of the molecules. The helix no longer exists. The light is no longer twisted as it travels, but is blocked by the lower polarizing filter, as shown in FIG. 13. The pixel appears dark.

Figure 14:
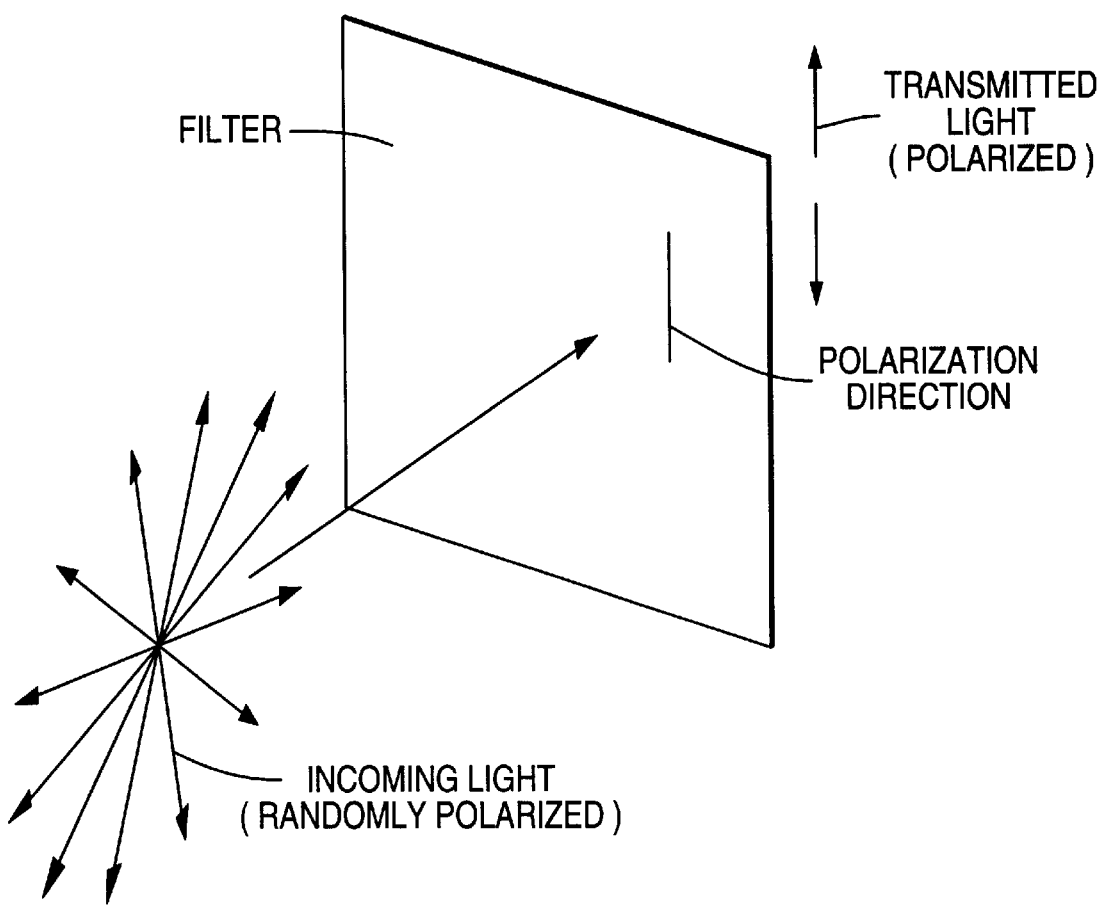
FIG. 14 illustrates a polarizing filter blocking light.

The polarizing filters impose significant light loss. That is, in a simplified sense, a polarizing filter blocks all light except that whose electric field vector is parallel to the direction of polarization. FIG. 14 shows this blockage: all light whose vectors are not parallel with the polarization direction of the filter F are blocked.

The polarizing filters in the prior-art LCD of FIGS. 10–13 generally block about fifty percent of the incident light. They are considered to be part of the shutter. This blockage represents a loss in illumination which is not desirable.

Figure 15:
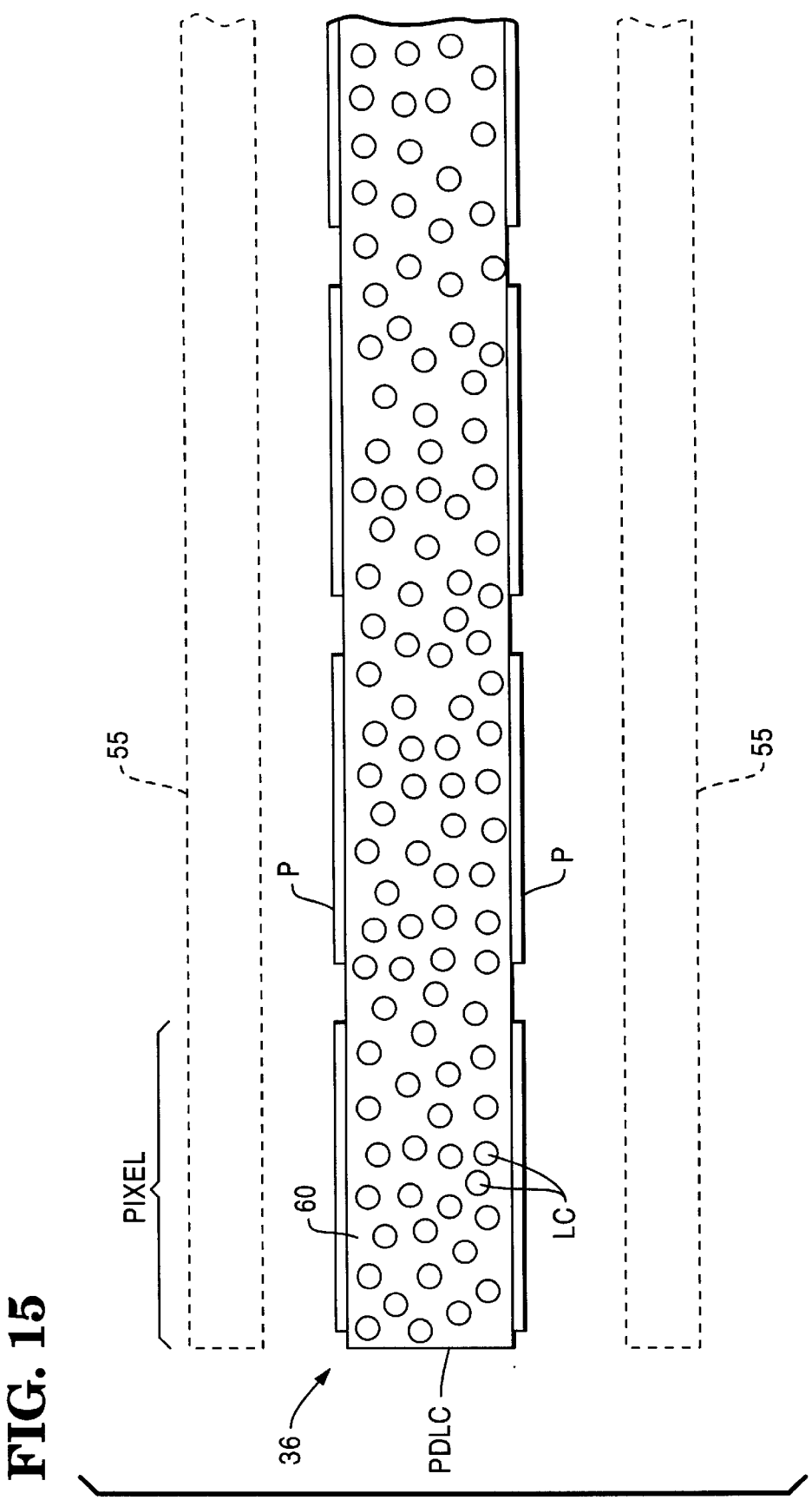
FIG. 15 illustrates a Polymer-Dispersed Liquid Crystal (PDLC), which can be used as a shutter, in place of the apparatus of FIG. 10.

One form of the present invention reduces this loss by utilizing Polymer-Dispersed Liquid Crystal (PDLC). PDLC is schematically shown in FIG. 15. A polymer matrix 60 carries small bubbles LC of liquid crystal material. The PDLC is opaque in its natural state. Application of an electric field, by applying a charge to plates P, makes the PDLC transparent.

The PDLC acts as the shutter 36 of FIG. 4. The PDLC eliminates the polarizing filters shown in FIGS. 10–13. In the PDLC, the light attenuation imposed by the shutter 36 in FIG. 4 is reduced to about 20 percent, or below. This reduction is below the fifty-percent figure common in the prior art.

PDLC is commercially available. Sheets can be purchased from suppliers such as Merck, located in England.

2. FIG. 4 shows a heat shield 38 which protects the liquid crystal shutter 36 from heat produced by the projection lamp 30. In one form of the invention, a liquid coolant can be applied to the shutter. The liquid coolant can circulate through a coolant jacket 55, shown in phantom in FIG. 15. (FIG. 15 shows a PDLC-type shutter 36. Other types can be used, such as LCD shutters.) Pumps, and other means, for circulating the coolant are known in the art.

In the case of the PDLC, coolant tubes can be molded directly into the PDLC sheet, as shown in FIG. 16. The PDLC contains channels C, which cooperate with transparent sheets S to form coolant passages, as indicated in FIG. 17.

In the liquid-cooled PDLC shutter, it is not strictly necessary that the index of refraction of the coolant be matched to that of the adjacent media (matrix 60, in FIGS. 16 and 17). The reason is that the incident light; (from the light source) is highly collimated: the rays are substantially parallel. Thus, the coolant will introduce no differential refraction of adjacent rays.

Figure 18:
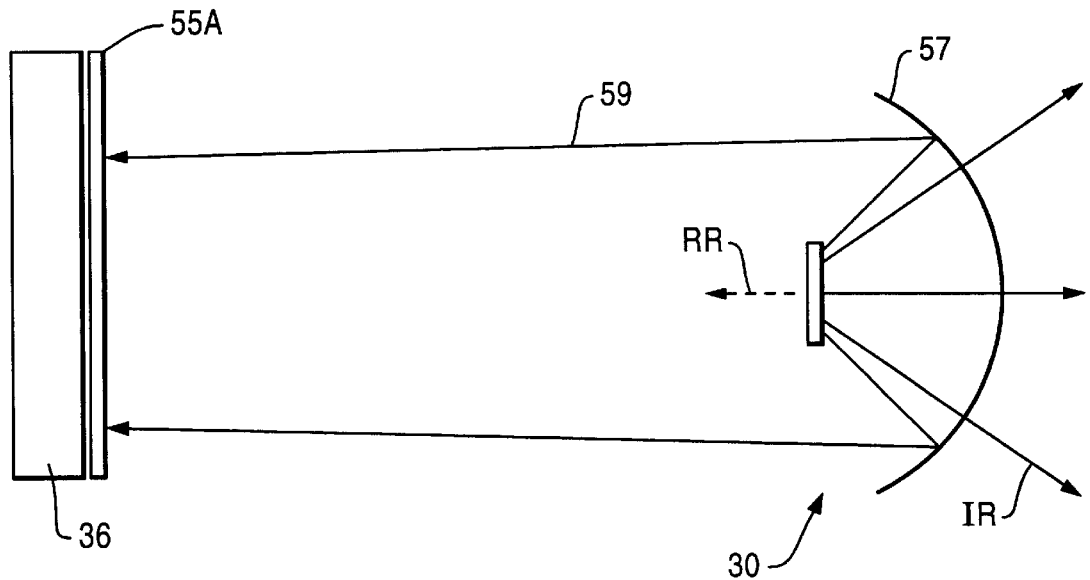
FIGS. 18 and 19 illustrate an infra-red reflective filter which blocks infra-red light from reaching the shutter 36.

3. The cooling of the liquid-crystal shutter 36 in FIG. 4 can be enhanced by a coating 55A which is reflective to infra-red frequencies, as shown in FIG. 18, which shows the shutter 36 and the light source 30. Quarter-wave coatings, known in the art, can be used. Such a coating will block infra-red light, by causing the light to self-cancel, thus reducing heat absorption by the liquid-crystal shutter 36.

This coating 55A can cooperate with a pre-existing structure found in many light sources. This structure is a dichroic reflector 57 in. FIG. 18. Ordinarily, this dichroic reflector 57 transmits infrared (IR) light, as indicated in FIG. 18, thereby removing much of the IR, and the heat it produces, from the optical path. The removed IR is not transmitted to the shutter 36.

However, the light beam 59 reaching the shutter 36 still contains some residual IR light, for two primary reasons.
 (1) The dichroic reflector 57 is not perfectly transparent to IR: it reflects some.
 (2) The light source 30 produces rays RR which are not subject to the filtering action of the dichroic reflector 57.

Figure 19:
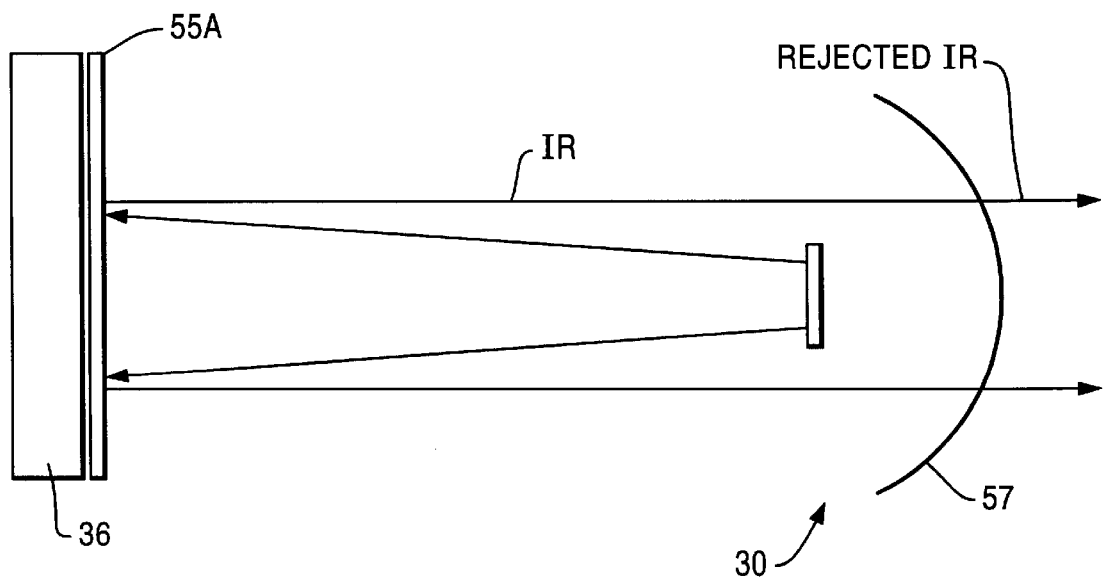

The IR-reflective coating on the shutter 36 will reflect much of this residual IR. Further, the reflected residual IR which reaches the dichroic reflector 57 will be transmitted through it, and largely rejected, as indicated in FIG. 19.

Thus, a three-stage filtering of IR is attained:

(1) The original light produced by the light source 30 and reflected by the dichroic reflector is filtered of much IR.

(2) Much of the residual IR reaching the shutter 36 is reflected by reflector 55A, and thereby blocked from the shutter 36.

(3) Much of the reflected residual IR which reaches the dichroic reflector 57 is rejected.

This IR-reflective liquid crystal shutter can be advantageous where the liquid-crystal shutter is very small (in the range of the size of a 35 millimeter photographic slide). Such a small shutter has a cross-sectional area comparable to that of the light source 30. Consequently, the dichroic reflector 57 captures much of the reflected residual IR (shown in FIG. 19). If the dichroic reflector 57 can reject much of this reflected residual IR, then a significant fraction of IR originally reaching the shutter 36 is reduced.

As indicated in FIG. 10, the liquid-crystal material is sandwiched between GLASS sheets (or other transparent material). The coating 55A in FIG. 18 can be, directly deposited upon the GLASS, in a known manner. Alternately, the function of the coating 55A can be assumed by a discrete element, which is positioned in place of the element 55A in FIG. 18.

If a discrete element is used, it is useful to position an impedance-matching medium (not shown) in the space between the element 55A and the LC shutter 36, to maximize transmission of visible light. The impedance-matching medium can act as an adhesive.

4. The coolant contained within the channels C in FIGS. 16 and 17 can be infra-red absorptive. That is, a tungsten filament within the lamp 30 in FIG. 4, which runs at 2,000 to 3,200 K, produces significant infra-red radiation in the range of 800 to 2600 nanometers (nm). The following substances have significant absorption peaks between about 2,700 and 3,000 nm:

Water, deuterium-depleted
Methyl Alcohol, 99.9%
Ethyl Alcohol, anhydrous
1-Propanol, 99+%
2-Methoxyethanol, 99%.

Therefore, it may be desirable to use one or more of these substances as the coolant, or as a component of the coolant.

Figure 20:
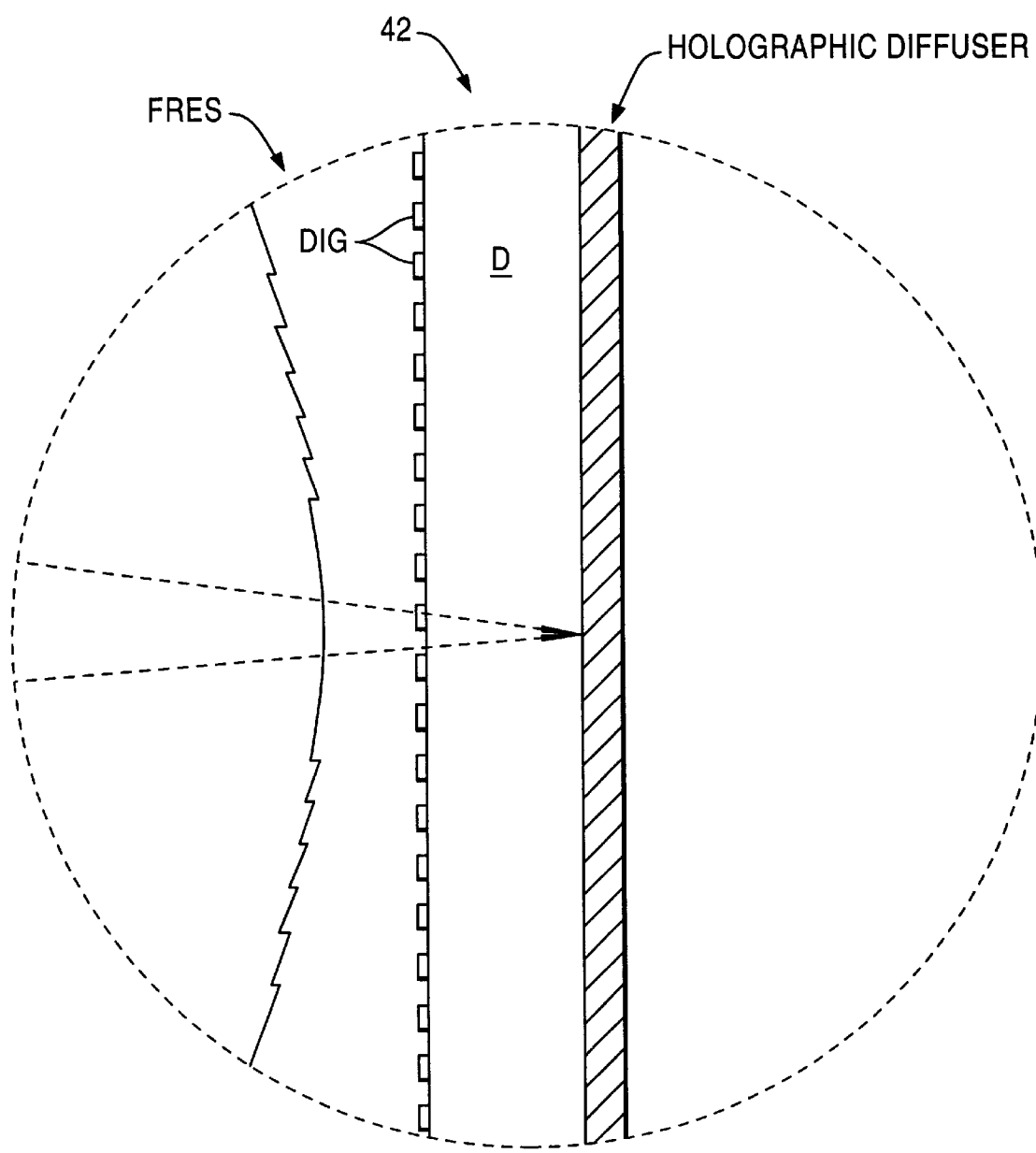
FIG. 20 illustrates a holographic diffuser carried on the display D1.

5. As FIG. 20 shows, a holographic diffuser can be used in place of (or in addition to) the matte surface. (The fresnel lens FRES in FIG. 20 is not strictly necessary.) Holographic diffusers have several advantages.

Figure 21:
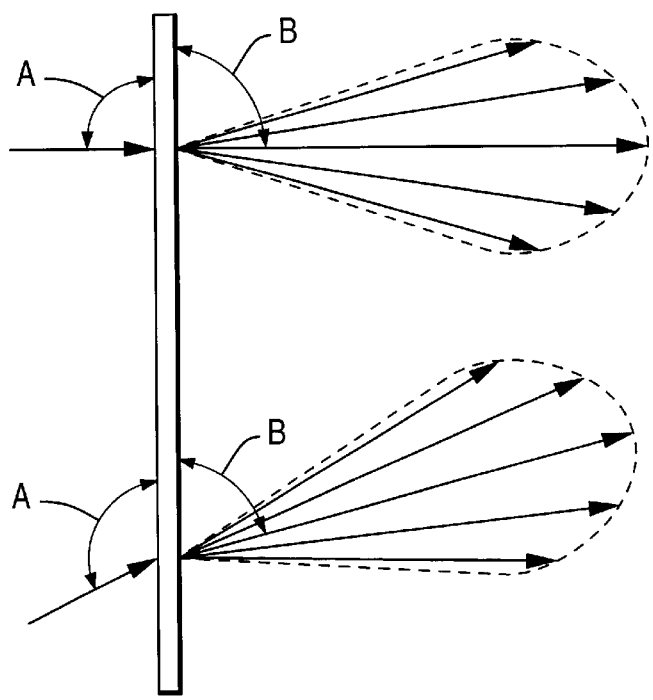
FIG. 21 illustrates how the output lobe in a conventional diffuser depends upon incidence angle.
Figure 22:
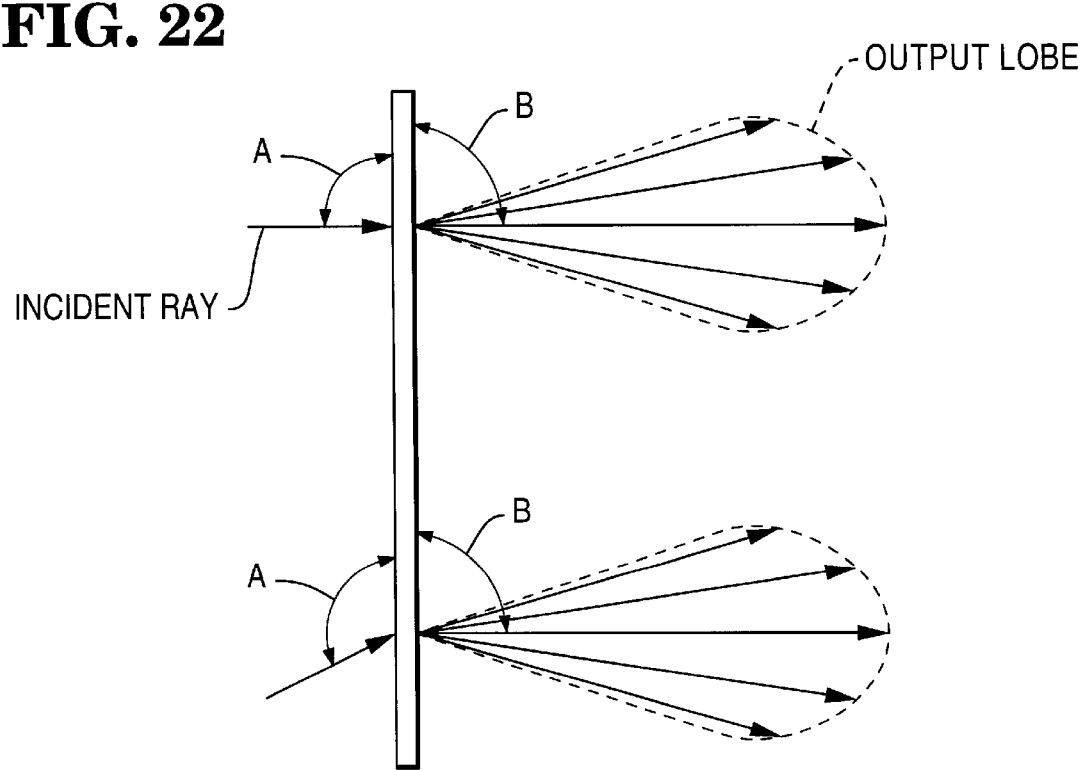
FIG. 22 illustrates how the output lobe in a holographic diffuser is substantially independent of incident angle.

For example, in a conventional diffuser, transmission angle B of the output lobe depends heavily upon the angle of incidence A of the INCIDENT RAY, as shown in FIG. 21. In contrast, with a holographic diffuser, there is much less dependence, as shown in FIG. 22 (provided that the angle of incidence A lies within prescribed limits).

(Angle of incidence is customarily defined between the incident ray and a line which is perpendicular with the surface. FIGS. 21 and 22 use a different definition, for ease of illustration.)

Figure 23:
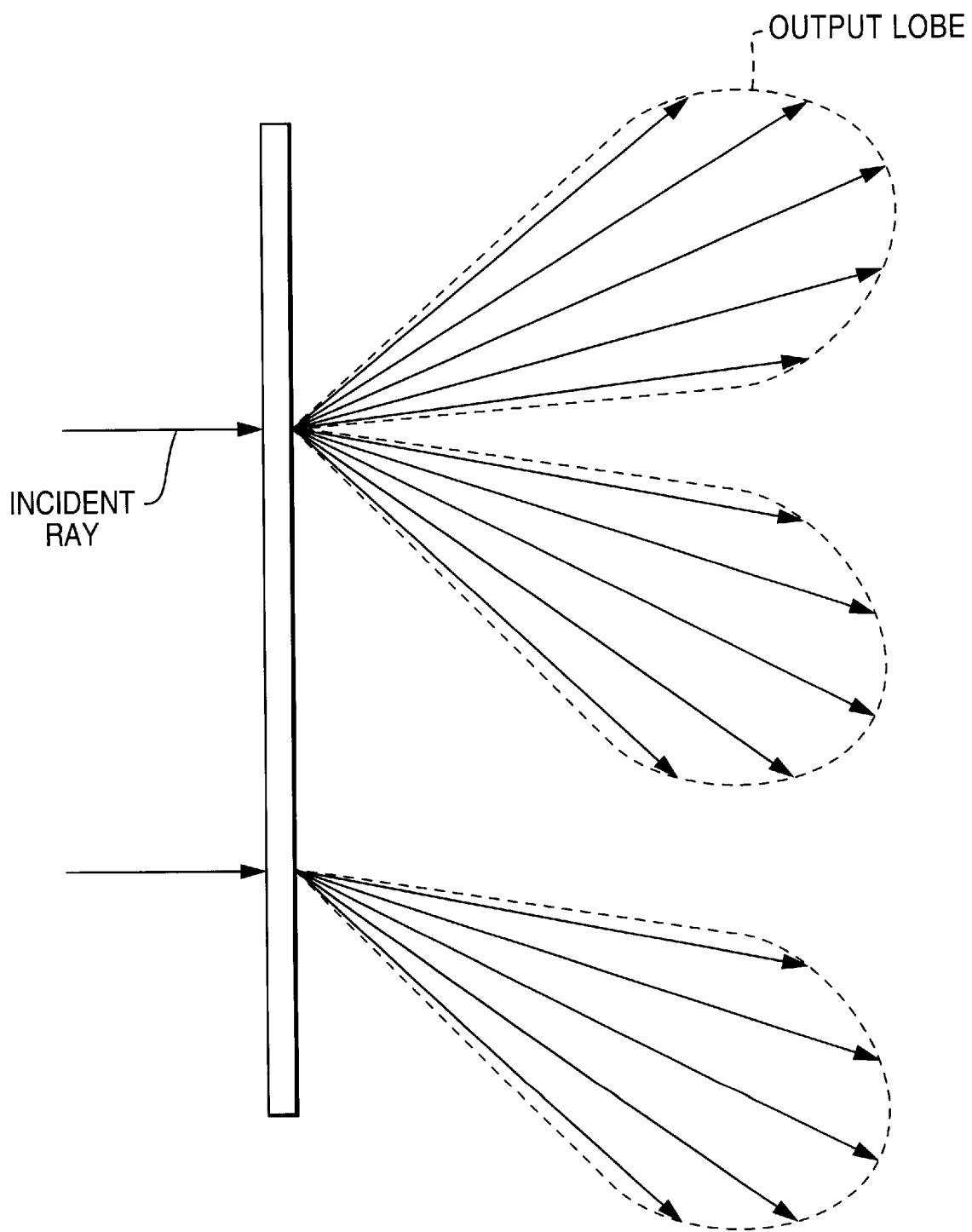
FIG. 23 illustrates how a holographic diffuser can adjust the output lobes.

As another example, a holographic diffuser can be designed such that a perpendicular INCIDENT RAY generates a non-perpendicular OUTPUT LOBE, as shown in FIG. 23. Also, a holographic diffuser can be designed such that the INCIDENT RAY produces multiple output lobes, as also shown in FIG. 23.

As yet another example, holographic diffusers allow the aspect ratio of the output lobe to be controlled. FIG. 24 shows a circular cross-section at the top (unity aspect ratio), and a flat cross-section (low aspect ratio) at the bottom.

Control of these characteristics of holographic diffusers is desirable in liquid crystal displays. This control allows control over the light dispersion of the image.

Holographic diffusers are commercially available. One supplier is Kaiser Optical Systems, Inc., located in Ann Arbor, Mich. One type of holographic diffuser is a holographic recording of a speckle pattern (such as paint lightly sprayed on a wall) generated by an optical system containing conventional scattering diffusers.

6. Several examples of large-screen displays were alluded to above. The invention is not restricted to large-screen displays, and can be used in small displays, such as those found in palm-sized and notebook-sized computers and calculators. Further, while digitizers are perhaps most commonly used on small displays, as in pen-based notebook computers, the invention contemplates the use of a digitizer on a large-screen display, of a size of 2×3 feet, or larger.

7. The following U.S. patents are incorporated by reference:

| Patent No. | Inventor | Issue Date |
| --- | --- | --- |
| 4,945,348 | Ibamoto et al. | Jul 31, 1990 |
| 4,938,570 | Majima et al. | Jul 3, 1990 |
| 4,853,493 | Schlosser et al. | Aug 1, 1989 |
| 4,707,572 | Kable et al. | Nov 17, 1987 |
| 4,695,680 | Kable | Sep 22, 1987 |
| 4,678,869 | Kable | Jul 7, 1987 |
| 4,665,283 | Kable et al. | May 12, 1987 |
| 4,649,232 | Nakamura et al. | Mar 10, 1987 |
| 4,650,926 | Nakamura et al. | Mar 17, 1987 |
| 4,600,807 | Kable | Jul 15, 1986 |
| 4,523,654 | Quayle et al. | Jun 18, 1985 |
| 4,456,787 | Schlosser et al. | Jun 26, 1984 |
| 4,055,726 | Turner et al. | Oct 25, 1977 |
| 3,699,439 | Turner | Oct 17, 1972 |

These patents provide information regarding digitizers, which are devices which detect the position of a pointer which is adjacent to, or in contact with, the display D1 in FIG. 4.

8. In FIG. 4, an optical path (not specifically shown) runs from the light source 30 to the display D1. In the encircled insert, the matte surface MAT is closer to the shutter 36, on the optical path, than is the digitizing grid DIG. The term "closer" refers to distance measured along the optical path.

Numerous substitutions and modifications can be undertaken without departing from the true spirit and scope of the invention. What is desired to be secured by Letters Patent is the Invention as defined in the following claims.

What is claimed is:

1. In an optical projection system, which (A) contains a liquid-crystal shutter which produces an image in response to electric fields applied to pixels, and which modulates light produced by a light source, and (B) projects the modulated light to a display screen, the improvement comprising:

a) means for producing a signal indicative of location of a hand-held pointer on the display screen; and b) a liquid coolant for removing heat from the shutter.

2. Apparatus according to claim 1 in which the liquid coolant is significantly absorptive at infra-red frequencies.

3. Apparatus according to claim 2 in which the liquid coolant comprises one component selected from the following group:

Water, deuterium-depleted,

Methyl Alcohol, 99.9%,
Ethyl Alcohol, anhydrous,
1-Propanol, 99+%, and
2-Methoxyethanol, 99%.

4. A screen upon which an image may be projected, comprising:
   a) a matte surface along which a user can drag a stylus; and
   b) a grid of conductors extending over a substantial part of the screen.

5. A screen according to claim 4, and further comprising
   c) a Fresnel lens for focusing the image.

6. In an optical display containing a liquid-crystal shutter, in which transmissivity of pixels is controlled by application of electric fields to the pixels, and a light source for illuminating the shutter, the improvement comprising:
   a) a filter between the light source and the shutter which blocks infra-red radiation from the shutter; and said light source containing:
   b) a filament;
   c) a dichroic reflector which
      i) receives light from the filament and
         A) rejects infra-red light from the received light and
         B) reflects visible light toward the shutter; and
      ii) receives infra-red light reflected by said filter, and rejects at least part thereof.

7. A video display, comprising:
   a) an image generation system which includes:
      i) a light source;
      ii) a modulator for modulating the light source, on a pixel-by-pixel basis;
      iii) a screen for displaying the modulated light; and
      iv) a holographic diffuser associated with the screen; and
   b) means for detecting position of a hand-held pointer on the screen.

8. A video display, comprising:
   a) a shutter, comprising polymer-dispersed liquid crystal material;
   b) a light source for projecting light through the shutter; and
   c) a screen for displaying light received from the shutter; and wherein no substantial attenuation of light occurs because of polarizing filters associated with the shutter.

9. An optical projection system, comprising:
   a) a liquid-crystal shutter, in which transmissivity of pixels is controlled by application of electric fields;
   b) a light source for projecting light through the shutter;
   c) a display screen on which the projected light produces an image; and
   d) a plurality of conductors associated with the display screen, for use in detection of position of a stylus; and wherein no phase change of liquid crystal occurs during normal operation.

\* \* \* \* \*